Aug. 28, 1962 B. W. LEE 3,051,855

SELF-CORRECTING RING COUNTER

Filed Sept. 23, 1959

INVENTOR
B. W. LEE
BY
R. C. Winter
ATTORNEY

United States Patent Office 3,051,855

Patented Aug. 28, 1962

3,051,855
SELF-CORRECTING RING COUNTER

Bock W. Lee, Berkeley, Calif., assignor to Bell Telephone Laboratories, Incorporated, New York, N.Y., a corporation of New York Filed Sept. 23, 1959, Ser. No. 841,768
16 Claims. (Cl. 307—88.5)

This invention relates to electrical switching circuits and more particularly to such circuits using bistable elements arranged in counting chains.

Electrical switching circuits are widely employed in electronic systems to perform various counting, timing and code generating functions. In certain applications of bistable switching elements in concatenation, it is customary to cause a given status, such as the set condition, to be sequentially propagated through the switching element chain. For example, in a closed loop shift register or ring counter, it may be desirable to propagate the set state through the successive switching elements of the chain in such a manner that one and only one of the elements is in the set state at any given time. It is also often desirable, for example in the control of a remote telephone line concentrator from a central office, to reset with but a single reset signal all the stages of a remote counter (except a first or pilot state), and to insure that the state of the counter remains unchanged until triggered by a predetermined signal from the central office.

For any of a number of reasons, such as a power supply voltage surge or a transient change in circuit parameters which gives rise to a momentary instability, one or more of the bistable switching elements may undergo a spurious and undesired change of state so as to become set in the absence of an input signal of proper magnitude and polarity being applied to their respective set input terminals. In circuit applications requiring a high degree of reliability, such malfunctions may partially be overcome by resorting to the use of known bistable switching elements which exhibit a high degree of stability. However, even such circuits are known to undergo occasional instability, and accordingly, simple and efficient means for automatically detecting and correcting the state of such elements become desirable.

It is an object of the present invention to improve the reliability of electrical switching circuits.

It is another object to provide a self-checking and self-correcting shift register.

It is a further object of this invention to provide a simple and efficient correction circuit for commutative switching systems.

In accordance with the principles of the present invention in one aspect thereof, a comparison circuit is inserted between the output and input terminals of a bistable switching element, which circuit responds to the presence of a pulse signal at the output terminal in the absence of an appropriate driving signal at the input terminal to couple the output pulse signal to a reset terminal of the switching element.

According to a further aspect of the present invention, the comparison circuit is connected so as to respond to the output state of an associated stage of a multistage counting chain and the output state of the next preceding stage of the chain. Thus it serves to correct the state of the associated stage if such stage changes to a state different from the state present in the previous stage.

According to one illustrative embodiment of the present invention, bias actuated pulse coupling means are inserted between the output and reset input terminals of a given stage and the output terminal of a next preceding stage of a commutative switching circuit so that a reset condition exhibited at the output terminal of the preceding stage biases the pulse coupling means to complete an operative circuit path between the output and reset input terminals of a given stage, whereas a set condition exhibited at the output terminal of the preceding stage biases the pulse coupling means so as to inhibit completion of such a circuit path.

It is a feature of the present invention that the erroneously set output of a bistable element be directed to reset the state of the element.

Another feature of the present invention is a counting chain wherein a falsely set switching element generates its own reset signal.

It is another feature of the present invention that the normal set output of a bistable switching element be inhibited from the reset input terminal of the element while an erroneously set output be directed to reset the state of the element.

A further feature of this invention is a ring counter having additional gating means between each pair of bistable elements for preventing simultaneous operation of more than one such bistable element.

Yet another feature is circuit means for selectively comparing the transient output of any stage of a multistage counting chain with the quiescent output of the next preceding stage and for developing a control signal to maintain the state of the stage in correspondence with the state of the preceding stage.

The foregoing and other objects and features may be more readily understood from the following detailed description when read with reference to the accompanying drawing in which.

Figure 1:
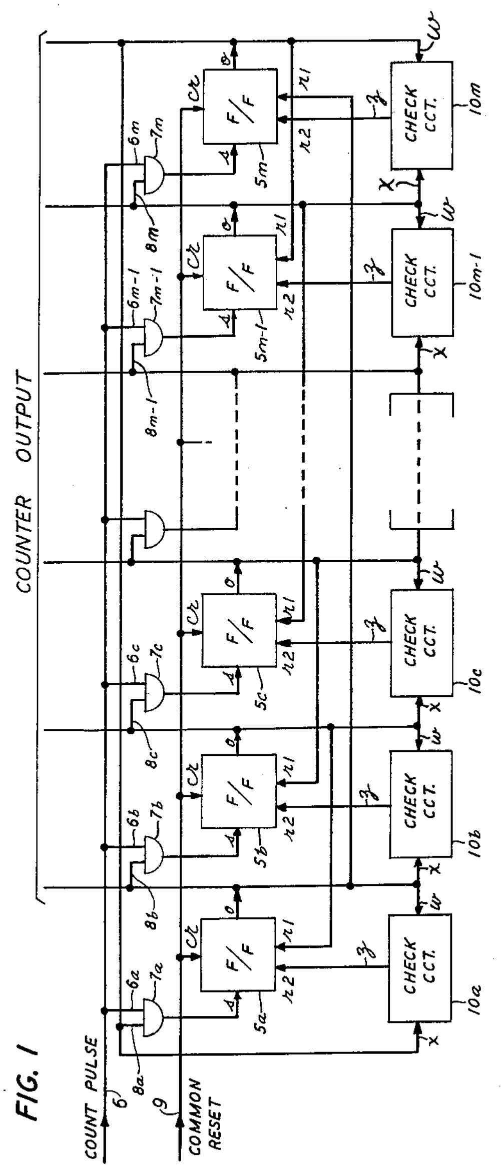
FIG. 1 shows a multistage ring counter in accordance with the principles of the invention.

Referring now to FIG. 1, there is illustrated a re-entrant counting chain comprising a number *n* of similar stages each including a corresponding one of the bistable switching elements 5*a* through 5*n*. Each of the elements 5*a* through 5*n* is shown having a set input terminals *s*, a pair of reset input terminals *r*1 and *r*2, respectively, a common reset input terminal *cr* and an output terminal *o*. Counting pulses applied to count pulse input bus 6 are coupled to one input terminal of AND gates 7*a* through 7*n* via leads 6*a* through 6*n*, respectively. As is well known, an AND gate is a circuit that delivers a signal at its output terminal only when each of its input terminals are concurrently energized. The other input terminals 8*a* through 8*n* of AND gates 7*a* through 7*n* are connected to the respective output terminal *o* of the next preceding one of the bistable switching circuits 5*a* through 5*n*. For example, the 8*a* input lead of AND gate 7*a*, which is associated with the first switching stage, is coupled to the output terminal *o* of bistable switching element 5*n* of the last switching stage.

Assuming the first switching element 5*a* to be in the set state, and elements 5*b* through 5*n* to be in the reset state, output terminal *o* of element 5*a* will exhibit a particular signal which in turn will appear at terminal 8*b* of AND gate 7*b*. When a count pulse is applied to input bus 6 and thus to lead 6*b* coincident with the presence of the set state signal at terminal 8*b*, AND gate 7*b* is operated to energize the set input terminal *s* of switching element 5*b*. When element 5*b* is set, its output terminal *o* energizes both lead 8*c* of AND gats 7*c* and the reset input terminal *r*1 of switching element 5*a*. Switching element 5*a* is accordingly reset. Thus, the set condition existing in the first switching element 5*a* may be sequentially advanced upon the application of count pulses by the setting of the stage following a set stage and by the resetting of the previously set stage.

The counting chain may be reset regardless of the count accruing in the chain by energization of common reset input bus 9 which is coupled to the common reset input terminal *cr* of each of the switching elements 5*a* through 5*n*. Advantageously, as will be hereinafter more fully explained in the discussion of FIG. 2, the common reset input bus 9 may be connected so that when it is eneregized, switching elements 5*b* through 5*n* will be reset while switching element 5*a* will be set. Equally advantageously, bus 9 may be connected to an external signal source (not shown) so that its energization will effect the resetting of all the stages of the chain with the setting of the first or pilot stage.

In addition to the aforementioned elements, and further in accordance with the principles of the present invention, a plurality of checking circuits 10*a* through 10*n* are associated with corresponding stages of the counting chain described above. Each of the checking circuits is shown having a terminal *w* coupled to the output of an associated one of the bistable switching elements 5*a* through 5*n*, a terminal *x* coupled to the terminal *w* of the preceding checking circuit, and a terminal *z* coupled to a reset input *r*2 of the associated one of the switching elements 5*a* through 5*n*.

Each of the checking circuits 10*a* through 10*n* functions to compare the status of signals presented to its terminals *w* and *x* in such a manner as to energize its terminal *z* whenever the signal condition at terminal *x* reflects the reset condition of the next preceding switching element simultaneously with the presence of a transient impulse signal at terminal *w*. Such a transient impulse signal corresponds to a change in the state of the associated switching element from the reset to the set condition. The resultant energization of the reset lead connected to terminal *z* counteracts the change in state occurring in the associated switching element.

Since the operating characteristics of the ring counter and checking circuits should be compatible, and since the operating characteristics of the ring counter are advantageously determined by the particular bistable switching element employed, an illustrative embodiment of a correction circuit suitable for use with a particular transistor switching circuit will be described.

Figure 2:
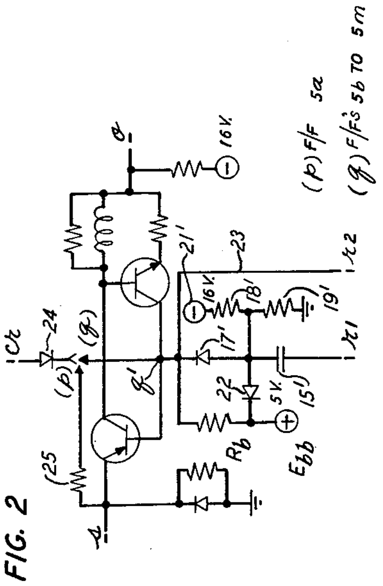
FIG. 2 shows a bistable switching element suitable for use in the counting chain of FIG. 1.

FIG. 2 shows a transistor flip-flop circuit suitable for use in the re-entrant counting chain of FIG. 1. The transistor circuit utilizes the principles described in detail in my copending application, Serial No. 654,604, filed April 23, 1957. Briefly, two junction transistors of opposite conductivity types having the base of each connected to the collector of the other form a bistable three-terminal current-multiplication device exhibiting a negative resistance region in a portion of the combined emitter voltage-emitter current characteristic. The values of the supply voltage and of the resistors are chosen for bistable operation, the load line traversing the negative resistance region between the points of stable operation at the intersections with the low and high positive resistance curvilinear regions. Terminal *s* functions as the effective emitter terminal, terminal *o* as the effective collector and point *q'* as the effective base terminal of the bistable transistor switching device. The flip-flop is set by applying a positive pulse to terminal *s*. With the supply voltages and components selected as in the cited copending application, the potential of terminal *o* rises from approximately minus 16 volts to about minus 2 volts when the flip-flop is set. Terminal *o* remains at the minus 2 volt potential until the flip-flop is reset by a positive pulse applied to point *q'*.

In addition to the components described in the copending application, there are three reset pulse input circuits connected to the effective base terminal *q'* of the bistable circuit. The first of these reset pulse input circuits comprises terminal *r*1, pulse coupling capacitor 15', diode 17', biasing resistors 18' and 19' and negative battery 21'. Diode 17' is poled to be conductive to positive pulses coupled through capacitor 15' which exceed the potential of point *q'*. Biasing resistors 18' and 19' are selected to maintain diode 17' back-biased in the absence of such pulses. Since point *q'* will assume a potential of about minus 1 volt when the flip-flop is set and plus 5 volts when the flip-flop is reset, a bias of about minus 2 volts applied to the anode of diode 17' provides an adequate back bias. This potential obtains in a specific illustrative embodiment when the battery 21' is 16 volts, resistor 18' is 51,000 ohms and resistor 19' is 10,000 ohms. Diode 22 is poled to prevent point *q'* from becoming more positive than the potential of the base biasing battery $E_{bb}$, thereby avoiding Zener breakdown of the collector-base junctions of the transistors during positive reset pulses. Positive reset pulses are applied to the *r*1 input terminal of the switching circuit when its succeeding circuit is set, as described above.

Terminal *r*2 and lead 23 connecting terminal *r*2 and point *q'* comprise the second of the three reset input circuits to the flip-flop. Positive pulses are applied to terminal *r*2 from terminal *z* of the correction circuit when that circuit is energized as will hereinafter be described.

The third reset input circuit is provided by diode 24 which is poled to conduct positive reset pulses from terminal *cr* to point *q'* via optional connection *q*. As was mentioned above, the common reset bus 9 of the counting chain is advantageously coupled to the individual stages so that its energization will effect the resetting of stages 5*b* through 5*n* and the setting of the first stage 5*a*. Accordingly, the diode 24 of stages 5*b* through 5*n* will be connected to point *q'* via optional connection *q* while in stage 5*a* diode 24 will be connected to point *s* via optional connection *p* and resistor 25. In the specific illustrative embodiment, the value of resistor 25 is approximately 510 ohms.

Figure 3:
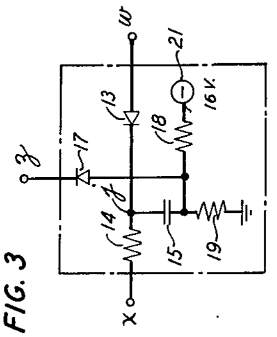
FIG. 3 shows the checking circuit of FIG. 1.

Referring now to FIG. 3, there is shown a checking circuit appropriate for use, in conjunction with the illustrative flip-flop of FIG. 2, in the counting chain of FIG. 1. The checking circuit input includes an isolating diode 13 connected to terminal *w* and an isolating resistor 14 connected to terminal *x*. Diode 13 is shown poled in the direction to be conductive under conditions when terminal *w* is more positive than the junction *j* of diode 13 and resistor 14. Connected to the junction *j* of diode 13 and resistor 14 is pulse coupling capacitor 15 which in turn is coupled to the junction of steering diode 17 and biasing resistors 18 and 19. Steering diode 17 is poled in the direction to pass positive going pulses coupled from terminal *w* through isolating diode 13 and coupling capacitor 15 Resistors 18 and 19 and the potential of negative battery 21 are advantageously similar to the corresponding resistors 18', 19' and potential 21' of FIG. 2.

Assuming as above, that the first stage 5*a* of the circuit of FIG. 1 is in the set condition, and that all other stages are in the reset condition, in accordance with normal operation, output terminal *o* of the first stage will be at a quiescent negative voltage (about minus 2 volts) which is smaller in absolute magnitude (more positive than) the voltage obtaining at the terminals *o* of the reset stages (about minus 16 volts). Since the stage 5*b* output terminal which is at a potential of minus 16 volts is coupled to terminal *w* of checking circuit 10*b*, while the stage 5*a* output terminal which is at a potential of minus 2 volts, is coupled to terminal *x* of circuit 10*b*, isolating diode 13 will be reversed biased.

Upon the application of a count pulse to input bus 6, AND gate 7*b* will be operated to energize terminal *s* of stage 5*b* and cause stage 5*b* to become set. Output terminal *o* of stage 5*b* will accordingly undergo a potential rise which is applied to terminal *w* of checking circuit 10*b*. However, since terminal *x* of circuit 10*b* is coupled to the output terminal *o* of stage 5*a* upon which there appears the quiescent voltage (minus 2 volts) associated with the set state of stage 5*a*, diode 13 does not become forward-biased and consequently the junction *j* of diode 13 and resistor 14 will experience no change in potential due to the rise in potential at terminal *w*. Since the junction point *j* of diode 13 and resistor 14 experiences no change in potential, no signals will be coupled through capacitor 15. The rise in potential of terminal *w*, however, is coupled to reset input lead *r*1 of the preceding stage 5*a* and is therein effective to reset stage 5*a*.

When stage 5*a* is reset its output terminal *o* undergoes a potential drop from minus 2 volts to minus 16 volts. This drop is applied to terminal *x* of checking circuit 10*b*. The junction *j* of circuit 10*b* will, however, remain at substantially minus 2 volts because throughout the change in potential of terminal *x* diode 13 is in its forward-biased condition offering a low impedance as compared to the resistance 14. Junction *j* remains at the minus 2-volt potential of terminal *w*, and accordingly, no pulse is coupled to terminal *z*. Thus, it is seen that neither the potential rise of terminal *w*, nor the potential fall of terminal *x* which accompanies the normal switching and resetting of the bistable switching elements, will produce a signal at output terminal *z*.

On the other hand, should a switching stage for some reason undergo a spurious change in state, its associated checking circuit would couple the accompanying potential rise appearing at its output terminal to its reset input terminal *r*2. Thus, assuming that stage 5*a* is set and all other stages reset in accordance with the normal operation thus far described, a spurious setting of stage 5*c* would cause terminal *w* of checking circuit 10*c* to undergo a potential rise of about 14 volts (from minus 16 to minus 2 volts). Since stage 5*b* is in the reset condition, terminal *x* of circuit 10*c* is at minus 16 volts and diode 13 of circuit 10*c* is forward-biased. The potential rise of 14 volts is coupled through capacitor 15 and steering diode 17 to terminal *z* and applied to terminal *r*2 of stage 5*c* thereby resetting the spuriously set stage.

It is to be understood that the above-described arrangements are illustrative of the application of the principles of the present invention. Numerous other arrangements may be devised by those skilled in the art without departing from the scope of the invention.

What is claimed is:

1. A self-correcting bistable circuit comprising a bistable switching element having set and reset terminals for driving signal inputs and a terminal exhibiting a pulse signal output when said element undergoes a change from one to the other of its stable states, comparison circuit means connected between said output and said set input terminal for coupling said signal pulse to said reset terminal, and means responsive to said driving signal input when present at said set input for blocking said coupling of said pulse signal output.

2. In an electrical circuit of the type settable to a first stable condition by applying a given polarity signal at an input point, said circuit exhibiting a transition signal of said given polarity at an output point while said condition is being set, said circuit being resettable to a second stable condition by applying a signal of said given polarity to a reset point, the improvement comprising gate means for coupling said given polarity transition signal from said output point to said reset point, and means coupled to said input point and responsive to the presence thereat of said given polarity signal for blocking said gate means.

3. A self-correcting bistable circuit, comprising a bistable switching element having set and reset inputs for establishing and maintaining a desired stable state and an output for indicating said stable state, gate means for selectively coupling said output to said reset input, and means coupled to said set input for actuating said gate means to bring the state of said output into correspondence with the state of said set input.

4. A self-correcting bistable circuit in accordance with claim 3, wherein said means coupled to said set input includes means for energizing said set input and means for inhibiting said gate means.

5. A self-correcting bistable circuit in accordance with claim 4, wherein said gate means includes unidirectional pulse coupling means.

6. A self-correcting bistable circuit in accordance with claim 5 wherein said means for inhibiting said gate means comprises means for normally back-biasing said unidirectional pulse coupling means and means for selectively altering said back-bias.

7. An electrical circuit comprising a chain of bistable switching devices connected for the sequential propagation therethrough of a predetermined switching state, means responsive to the occurrence of said predetermined state in any particular one of said devices and to the switching state of a preceding one of said devices for developing a correction signal, and means responsive to said correction signal for re-establishing the priorly existing switching state in said particular one of said devices when said preceding one of said devices is not in said predetermined switching state.

8. A circuit comprising at least a first and second bistable swtiching device, transfer means coupling said first and second device for advancing a switching condition from said first to said second device, and checking circuit means connected between said first and said second device for correcting a switching condition occurring in said second device in the absence of a corresponding switching condition being coupled to said second device by said transfer means.

9. In a cascaded array of switching elements, the combination comprising means for advancing a predetermined switched condition through said array means responsive to input pulses to be counted, and means coupled to said elements and responsive to the simultaneous presence of said switched condition in one of said elements and said switched condition occurring in a succeeding element for changing said occurring condition of said succeeding element independently of said input pulses.

10. A re-entrant chain counter comprising a plurality of bistable switching elements each having at least one input and an output, means responsive to input pulses to be counted for transferring signals from each switching element output to an input of a succeeding element, and means coupled to the output of a preceding element of said chain for transferring signals independently of said input pulses from each switching element output to an input of the same element to change the condition of said same element.

11. A shift register comprising cascaded bistable stages, means for setting concurrently one stage in one stable state and the other stages in the other stable state, gating means for applying an input signal to each stage to advance said one stable state through consecutive stages, means for enabling said gating means associated with each stage comprising means for applying the output of each stage to the corresponding gating means, means for correcting the erroneous registration of said one stable state in any of said stages comprising means for comparing the output of each stage with the output of the next succeeding stage, means for applying the comparison resultant indicative of an error to one reset input of said succeeding stage, and means for applying the output of each stage to another reset input of the preceding stage.

12. A shift register in accordance with claim 11 wherein said correcting means comprises first and second serially connected impedance means respectively coupled to the outputs of successive ones of said stages and pulse couplings connected between the junction of said serially connected impedance means and a reset input terminal of one of said stages.

13. A shift register in accordance with claim 12 wherein said first impedance means is unilaterally conductive, and wherein said second impedance means controls the conductivity of said first impedance means.

14. A counting circuit comprising an array of bistable circuits each having a set, an output, and a pair of reset terminals, gating means connecting each output terminal to the set terminal of the succeeding bistable circuit in said array, means applying enabling pulses simultaneously to said gating means, means connecting each output terminal to a first of said reset terminals of the preceding bistable circuit in said array, and checking circuit means associated with each of said bistable circuits for correcting erroneous setting of any of said bistable circuits, said checking circuit means comprising means for comparing the voltage at the output terminal of said associated bistable circuit and the voltage at the output terminal of the preceding bistable circuit and pulse transfer means coupling said comparing means to the second of said reset terminals of said associated bistable circuit.

15. A self-correcting circuit, comprising a bistable circuit having at least a set, an output, and a reset terminal, diode means connected to said output terminal and poled for passage of a pulse therethrough when an output condition is present at said output terminal in the absence of a corresponding set condition at said set terminal, impedance means connected between said set terminal and said diode means, and means connecting the junction of said impedance means and said diode means to said reset terminal, said connecting means including a coupling capacitor and a diode poled for passage of said priorly mentioned pulse.

16. A self-correcting circuit in accordance with claim 15 wherein the impedance of said impedance means is substantially greater than the forward impedance and substantially less than the back impedance of said diode means.

References Cited in the file of this patent

UNITED STATES PATENTS

| | | |
|---|---|---|
| 2,521,774 | Bliss | Sept. 12, 1950 |
| 2,551,119 | Haddad | May 1, 1951 |
| 2,749,437 | Parr | June 5, 1956 |
| 2,888,556 | Richards | May 26, 1959 |
| 2,897,363 | Gorgas | July 28, 1959 |
| 2,909,678 | Jensen | Oct. 20, 1959 |
| 2,924,788 | Maurushat | Feb. 9, 1960 |
| 2,931,922 | Tubinis | Apr. 5, 1960 |
| 2,971,157 | Harper | Feb. 7, 1961 |

FOREIGN PATENTS

| | | |
|---|---|---|
| 1,182,251 | France | June 24, 1959 |